United States Patent Office 3,418,260
Patented Dec. 24, 1968

3,418,260
IMIDAZOLE-BORANE POLYMERS
Swiatoslaw Trofimenko, Chatham, Del., assignor to E. I. du Pont de Nemours and Company, Wilmington, Del., a corporation of Delaware
No Drawing. Filed Jan. 20, 1966, Ser. No. 521,812
9 Claims. (Cl. 260—2)

ABSTRACT OF THE DISCLOSURE

Imidazole-borane polymers having a recurring unit of the formula

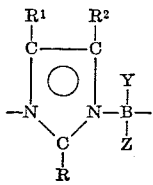

in which R, $R^1$, $R^2$, Y and Z represent hydrogen, halogen or a variety of alkyl, aryl and other substituents can be made by reacting an appropriate imidazole with a boron compound BXYZ or a complex thereof with an electron donor molecule in which X is hydrogen, halogen or alkyl, provided that if uncomplexed BXYZ is used, at least one substituent other than hydrogen must be present. The polymers are useful as viscosity increasing additives to oils, and in some instances for making heat resistant films.

DESCRIPTION OF THE INVENTION

This invention relates to imidazole polymers and their preparation. More specifically, the invention concerns imidazole-borane polymers and their preparation.

The novel polymers of this invention are represented by the recurring structural formula:

I 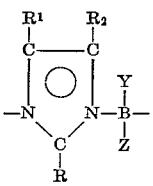

Y and Z can be alike or different and are selected from the group consisting of hydrogen, halogen (fluorine, chlorine, bromine, or iodine), hydrocarbyl of up to 12 carbon atoms, O-hydrocarbyl of up to 12 carbon atoms, and substituted hydrocarbyl and O-hydrocarbyl groups in which the substituents can be halogen, oxyalkyl or oxyaryl of up to 6 carbon atoms. Y and Z can be combined to form the divalent groups -O-alkyl-O- and -O-aryl-O- of up to 6 carbon atoms.

R, $R^1$ and $R^2$ can be alike or different and are selected from the group consisting of hydrogen, halogen of atomic number 17–53, inclusive, alkyl of up to 15 carbon atoms, aryl of 6 through 10 carbon atoms, aralkyl of 7 through 12 carbon atoms, alkoxycarbonyl of up to 8 carbon atoms, alkoxyalkyl of up to 8 carbon atoms, alkoxy of up to 8 carbon atoms, alkylcarbonyl of up to 8 carbon atoms, arylcarbonyl of up to 12 carbon atoms, alkylthio of up to 8 carbon atoms, aralkylthio of up to 12 carbon atoms, cyano, nitro, formyl or dialkylcarbamido of up to 12 carbon atoms. $R^1$ and $R^2$ can be joined together to form a fused benzo ring, i.e.,

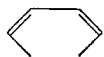

"Hydrocarbyl" includes the groups alkyl, alkylene, and aryl; and the "substituted hydrocarbyls" include haloalkyl, haloaryl, aryloxyalkyl, and aryloxyaryl. This definition of "hydrocarbyl" also applies to "-O-hydrocarbyl" by inserting an oxa(oxygen) atom before each group.

The foregoing Formula I sufficiently represents the polymers of this invention; however, other representations can be used to denote the resonance in the structural system. For example, the resonance between the dative and sigma bond can also be represented by the formulae:

II

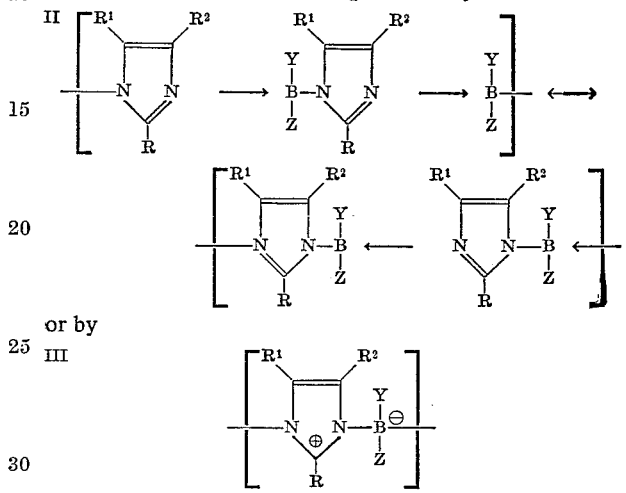

or by

III 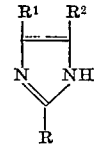

All of these structural representations are equivalent methods of representing the resonance which exists in the novel polymers, and the structure denoted by Formula I will be used herein.

The novel polymers are prepared by the process aspect of the invention which comprises reacting an imidazole of the formula $$\begin{array}{cc} R^1 & R^2 \\ \end{array}$$

with a borane of the formula BXYZ wherein Y and Z are defined as above, and X is hydrogen halogen (chlorine, bromine or iodine) or alkyl of 1 through 8 carbon atoms.

The BXYZ reactant is introduced into the reaction mixture either as such or as the compound BXYT·Q. If introduced as BXYZ, X, Y and Z are defined as above with the proviso that when Y is hydrogen only one of X and Z can be hydrogen. In addition when X, Y or Z are alkyl, they are preferably branched alkyl groups.

When the compound BXYZ·Q is employed, X, Y and Z are defined as in the paragraph preceding the above paragraph, i.e., each of X, Y and Z can be hydrogen. Q is defined as an electron donor. For example, Q can be a triloweralkylamine, a diloweralkylether, a diloweralkylsulfide, and the like, or when at least one of X, Y and Z is hydrogen, Q can be another BXYZ group to give, e.g., $B_2H_6, B_2H_2(C_2H_5)_4$, or the like.

The process is carried out by reacting the imidazole and the borane for a time sufficient to complete evolution of an equivalent amount of HX. Any ratio of the two reactants may be employed, but preferably, stoichiometric amounts (a 1:1 ratio), are used.

The optimum temperature for the reaction depends on the reactivity of the borane, such reactivity increasing in the order x-aryl, alkyl, hydrogen, halogen, and the reactivity of the imidazole, which mainly depends on the presence of bulky substituents that hinder reactivity. Thus, the lower range of operable temperatures is about 0° C. for the more reactive monomers, and just below the decomposition point of the polymer for the less reactive monomers, i.e., about 300° C. The preferred range is 100–200° C.

A solvent is not necessary; however, it is most convenient to achieve the temperatures employed by using a solvent with a reflux temperature within the desired range. The preferred solvents should be unreactive with either of the monomers, and should dissolve the monomers as well as the polymeric product. Such solvents include aliphatic and aromatic hydrocarbons, aliphatic and aromatic halocarbons and ethers.

The reaction may be carried out in an open system at atmospheric pressure with the by-product, HX being distilled out of the system. It is usually advantageous to measure the evolution of HX in some suitable manner such as by titration (if HX is an acid or base) or by a wet-test meter (a volumetric device) if HX is hydrogen or a low-boiling alkane. Alternatively, the reaction may be carried out in an autoclave at autogenous pressure with the end-point being reached upon cessation of further pressure increase (due to evolution of HX). Pressures up to 4000 p.s.i. have been attained in such reactions.

Since most of the borane reactants are either pyrophoric or sensitive to air and moisture, the reaction is preferably carried out in an inert, dry atmosphere. This is accomplished by blanketing the system with dry gases such as nitrogen, argon (or other inert gases), methane or other low-boiling hydrocarbons or halocarbons.

The novel polymers prepared by the foregoing process have molecular weights ranging from 320 to 12,000 or more. Most have molecular weights between 5,000 and 12,000. In general, they are stable to air, water and heat up to their decomposition points which range from 300° to about 450° C. depending upon the particular polymer. The polymers vary from viscous liquids to transparent solids.

The following examples illustrate, but do not limit, the novel products and process of this invention:

Example 1.—Poly-1-diethylborylimidazole
($R=R^1=R^2=H; X,Y,Z=C_2H_5$)

To a suspension of 6.8 g. (0.1 mole) of imidazole, stirred under nitrogen in 150 ml. of toluene, was added 14.8 ml. (0.106 mole) of triethylborane. Warming occurred (35°) and a clear solution was obtained. It was refluxed over 100 hrs. at which time 1.4 l. of ethane had been evolved. The solvent was distilled out at atmospheric pressure and the residue heated at 170–180° for 2 hrs. An additional 0.3 l. of ethane was evolved. The residue was a clear thick syrup soluble in toluene and chloroform but not in methanol.

Analysis.—Calcd. for $[C_7H_{13}BN_2]_n$: C, 61.8; H, 9.57; B, 7.94; N, 20.6. Found: C, 62.8; H, 9.82; B, 8.13; N, 20.0. Inherent viscosity (25% solution in chloroform at 25°): 0.31.

The N.M.R. spectrum was confirmatory with 3 peaks at $\tau$ 2.48 (singlet), 3.24 (singlet) and 9.67 (singlet) in the correct 1:2:10 ratio.

Example 2.—Poly-1-diethylborylimidazole

The reaction was run as in Example 1 but using o-dichlorobenzene as solvent. After ethane ceased to evolve, volatiles were removed at 200° in vacuo. The residual polymer had inherent viscosity (chloroform) of 0.73. Osmometrically (CHCl₃) determined molecular weight was about 6200. Films with adhesive properties were pressed from this polymer.

Example 3.—1-diethylboryl-2-methylimidazole tetramer
($R=CH_3; R^1=R^2=H; X,Y,Z=-C_2H_5$)

To a nitrogen-blanketed suspension of 16.4 g. (0.2 mole) 2-methylimidazole in 250 ml. xylene was added 28.2 ml. (0.2 mole) of triethylborane. Warming occurred and the solid dissolved. The solution was stirred and refluxed overnight. There was evolved 5 l. (100%) ethane. On cooling of the solution a solid separated. It was filtered, washed with toluene, hexane and air-dried. There was obtained 29.8 g. (99%) of crystals. The product sublimed at 300° (1 mm.). It was purified by recrystallization from boiling xylene, from which it crystallized as a solvate, and dried at 200°/1 mm. The product melts sharply at 346–347°.

Analysis.—Calcd. for $[C_8H_{15}BN_2]_n$: C, 64.0; H, 10.0; B, 7.21; N, 18.7. Found: C, 64.5; H, 10.3; B, 7.31; N, 18.9. Mol. wt. calcd. for tetramer: 600 Found (ebullioscopically in benzene): 632

Example 4.—Poly-1-diethylborylbenzimidazole ($R=H; R^1$ and $R^2=$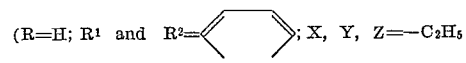; X, Y, Z$=-C_2H_5$)

To a nitrogen-blanketed suspension of 23.6 g. (0.2 mole) benzimidazole in 250 ml. xylene was added 28.2 ml. (0.2 mole) of triethylborane. Warming occurred and the solid dissolved. As the solution was refluxed, ethane was slowly evolved and a solid started precipitating. After refluxing overnight, 5.1 l. of ethane had been evolved and much more solid had precipitated. This was filtered, washed with toluene, hexane and air-dried. The yield of material, M.P. 415–420° (dec.), was 37 g. (88%). It shows no change on heating up to 410° in air.

Analysis.—Calcd. for $[C_{11}H_{15}BN_2]_n$: C, 71.0; H, 8.07; B, 5.80; N, 15.05. Found: C, 71.4; H, 8.10; B, 5.05; N, 15.1.

Example 5.—Poly-1-dihydroborylbenzimidazole ($R=H, R^1$ and $R^2=$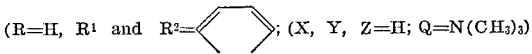; (X, Y, Z$=$H; Q$=N(CH_3)_3$)

A mixture of 14.6 g. (0.2 mole) trimethylamine borane and 23.6 g. (0.2 mole) benzimidazole was stirred and refluxed in 250 ml. toluene. When trimethylamine and hydrogen ceased to be evolved, the solution was cooled. A solid precipitated. It was filtered, washed with toluene, hexane and air dried. There was obtained 15.5 g. (60%) of white solid. The polymer had $BH_2$ bands at 2300–2500 cm.$^{-1}$ in the infrared.

Analysis.—Calcd. for $[C_7H_7BN_2]_n$: C, 64.7; H, 5.39; B, 8.32; N, 21.5. Found: C, 64.5; H, 5.60; B, 8.13; N, 20.5.

Example 6.—Poly-1-dihydroborylimidazole
($R,R^1,R^2,X,Y,Z=H$) and poly-1-dichloroborylimidazole
($R,R^1,R^2=H; Y,Z=Cl$)

Part A.—A mixture of 6.8 g. (0.1 mole) imidazole and 7.3 g. (0.1 mole) trimethylamine borane was stirred and refluxed in 150 ml. toluene. Trimethylamine was condensed into a −80° trap and hydrogen evolved was measured by a gas meter. Within ½ hr. the theoretical amount of $H_2$ (2.5 l.) was evolved. The solution was filtered ot remove a small amount of solid and the filtrate was stripped yielding 5 g. (63%) of a colorless syrup. The N.M.R. spectrum of poly-1-dihydroborylimidazole was confirmatory with two peaks in 1:2 ratio at about 2.3 and 3.2$\tau$ and the $BH_2$ hydrogens detectable by integration in the 8.3–9.1$\tau$ range.

Part B.—The polymer was dissolved in chloroform and chlorine was bubbled in until the yellow color persisted (hydrogen chloride was given off). The solid that precipitated was filtered, washed with methylene chloride and air-dried. Yield 8.8 g. (94%). The polymer is unaffected by heating to 280°/1 mm. The infrared spectrum shows no BH absorption.

Example 7.—Poly-1-dihydroboryl-2-methylimidazole
($R=CH_3; R^1,R^2=H; Y,Z=H$)

A mixture of 14.6 (0.2 mole) trimethylamine borane and 16.4 g. (0.2 mole) 2-methylimidazole was stirred and refluxed in 250 ml. toluene. Trimethylamine (trapped in a −80° trap) and hydrogen were evolved. Evolution stopped after 4 hours. The solution was concentrated yielding 8.4 g. of a solid. On heating it to 300° in vacuo, a sublimate was obtained and the residue was a colorless, transparent polymer.

Example 8.—Poly-1-diethylboryl-2,4,5-tribromomidazole
($R,R^1,R^2=Br, Y,Z=C_2H_5$)

To a suspension of 29.6 g. (0.97 mole) 2,4,5-tribromo-imidazole was added (under nitrogen) 13.8 ml. (0.97 mole) triethylborane. The reaction mixture was stirred and refluxed for 5½ hours in which time the theoretical amount of ethane was evolved. The reaction mixture was cooled and filtered. There was obtained 8.8 g. (24%) of solid polymer.

The filtrate was stripped yielding polymer of lower molecular weight as a viscous reddish syrup.

Example 9.—Poly-1-dibutylborylimidazole

A mixture of 37 g. (0.55 mole) imidazole and 91 g. (0.50 mole) tributylborane was placed in a 1.5 l. (nitrogen-flushed) autoclave along with 470 ml. xylene. The mixture was rocked and kept at 180° until no further pressure increase was observed for two hours. This took 11 hours. The reaction mixture was filtered and the solid (13 g.) was identified as unreacted imidazole. The filtrate was stripped and volatiles were removed in vacuo. The flask was cooled, 1 l. ethylene glycol was added and the mixture was boiled for ½ hour. The polymer became detached from the flask walls and formed a plastic cohesive mass. The mixture was cooled, the glycol was decanted and the polymer was boiled in water for 1 hour. A taffy-like white solid was obtained. It was heated to 260° in a stream of nitrogen to remove excess volatiles. A pale amber flexible glass was obtained. The glass was dissolved in warm chloroform, stirred with activated carbon and filtered. The filtrate was stripped and the solvent was removed at 190°/1 mm. The resulting amber polymer was analyzed.

*Analysis.*—Calcd. for $C_{11}H_{12}BN_2$: C, 68.8; H, 10.9; B, 5.62; N, 14.6. Found: C, 69.5; H, 11.1; B, 5.59; N, 15.0. Mol wt. (osomometry in chloroform at 37°): 7500. Thermogravimetric analysis showed a 5% weight loss at 357° C. Differential thermal analysis showed a glass transition temperature at −3° C. and an endotherm peaking at 368°. The inherent viscosity (0.25 solution in chloroform at 25°) was 0.54.

Example 10.—Poly-1-diethylborylimidazole

A mixture of 74 g. (0.75 mole) triethylborane and 55 g. (0.81 mole) imidazole was heated with 450 ml. xylene in a 1.5 l. nitrogen-flushed autoclave for 16 hours at which time no further pressure increase occurred. The resulting solution was stripped and the product was purified further by being heated in vacuo with an infrared lamp. The molecular weight of this polymer (osmometric in $CHCl_3$ at 37°) was 12200; $\eta$ inh. (0.25% solution in $CHCl_3$ at 25°): 0.46. This flexible, transparent polymer was unaffected by being boiled in water for 48 hours.

Example 11.—Poly-1-dihydroboryl-2-phenylimidazole

A mixture of 14.4 g. (0.1 mole) 2-phenylimidazole and 7.3 g. (0.1 mole) trimethylamine borane was stirred and refluxed in 150 ml. toluene until gas evolution ceased. On cooling, 7.4 g. of a solid separated. Stripping of the filtrate gave another 8.0 g. of solid. Total yield 15.4 g. or 99%. Both solids have $BH_2$ bands in the infrared. The first fraction gave hardly any sublimate on being heated at 300°/1 mm. It melted around 325°, started yellowing around 390° and decomposed around 460°. It was purified by drying at 200°/1 mm. and analyzed.

*Analysis.*—Calcd. for $C_9H_9BN_2$: C, 69.1; H, 5.77; B, 6.91; N, 17.9. Found: C, 68.9; H, 5.92; B, 7.26; N, 17.9.

Example 12.—Poly-1-diethylboryl-2-phenylimidazole

To a nitrogen-blanketed suspension of 25.5 g. (0.177 mole) 2-phenylimidazole in 250 ml. xylene was added 25.0 ml. (0.177 mole) triethylborane. The temperature rose from 25° to 31° and the solid dissolved. Upon heating, ethane evolution commenced at about 80° and became more brisk as the temperature rose. At 120°, when about 3 l. (67%) ethane had been evolved, solid started appearing. Within an hour, the theoretical amount of ethane was evolved and much solid was present. The mixture was cooled, the solid was filtered, washed with benzene, hexane and dried. There was obtained 33.0 g. (88%) of white solid that gradually darkens and melts in the 310–360° range. Heating in vacuo at 250–300° removes a small amount of volatile impurity and the residue melts at 335–347°.

*Analysis.*—Calcd. for $C_{13}H_{17}BN_2$: C, 73.7; H, 8.02; N, 13.2. Found: C, 74.1; H, 8.19; N, 13.2.

The imidazole reactants employed in this invention are well-known compounds. A representative list of imidazoles which can be used in the process of the invention includes 2 - phenyl-4-methylimidazole, 2-phenyl-4-phenylimidazole, diethyl imidazole-4,5-dicarboxylate, 2,4,5-triphenylimidazole, 2-ethylimidazole, 4-methylimidazole, 2,-4 - dimethylimidazole, 4,5 - dimethylimidazole, 2,4,5-trimethylimidazole, 2-benzylimidazole, 4-phenylimidazole, 4-methyl - 5 - phenylimidazole, 4,5-diphenylimidazole, 4-methyl - 2-styrylimidazole, 2-bromoimidazole, 4-bromoimidazole, 2,4-dibromoimidazole, 4.5-dibromoimidazole, 2,4,5-tribromoimidazole, 2,4,5-triiodoimidazole, 4-bromo-5 - phenylimidazole, 2,4-dibromo-5-phenylimidazole, 4-nitroimidazole, 4 - nitro - 2-methylimidazole, 4-nitro-5-methylimidazole, 2 - methylthioimidazole, 2-benzylthioimidazole, 4 - chloromethylimidazole, imidazole - 4-carboxaldehyde, 5 - methylimidazole-4-carboxaldehyde, 5-methyl - 2-phenylimidazole-4-carboxaldehyde, 2-acetylimidazole, 5 - acetyl-2-methylimidazole, 2-benzoylimidazole, 2 - benzoyl-4-phenylimidazole, 2-benzyl-4-carbomethoxyimidazole, 2-dodecylimidazole, 4-(or 5-) ethoxymethylimidazole, 2-ethylthioimidazole, 2-pentadecylimidazole, 4 - (or 5-)methoxyimidazole, imidazole-4,5-dicarbonitrile, 2 - methylimidazole-4,5-dicarbonitrile and imidazole-4,5-bis(N-methylcarboxamide).

Preferred imidazoles are those in which R, $R^1$ and $R^2$ are hydrogen, alkyl of 1 through 6 carbon atoms, aryl of 6 through 10 carbon atoms (phenyl is most preferred), and halogen (chlorine, bromine or iodine).

The borane reactants are also well-known compounds. Representative boranes and borane complexes which can be used in the process of the invention include diborane, tetrahydrofuran borane, pyridine borane, butoxydichloroborane, methoxydichloroborane, ethoxydichloroborane, 2-chloroethoxydichloroborane, 3 - chloropropoxydichloroborane, 4-chlorobutoxydichloroborane, allyloxydichloroborane, but-3-en-1-yloxydichloroborane, 2-methylallyloxydichloroborane, dimethoxychloroborane, diethoxychloroborane, dibutoxychloroborane, bis-(2 - chloroethoxy)-chloroborane, bis(3-chloropropoxy)chloroborane, bis(4-chlorobutoxy)chloroborane, diallyloxychloroborane, bis-(but-2-en-1-yl-oxy)chloroborane, bis(1-methylallyloxy)-chloroborane, bis(2-methylallyloxy)chloroborane, ethylenedioxychloroborane, diphenoxychloroborane, phenoxydichloroborane, o-phenylenedioxychloroborane, p-methoxyphenyldichloroborane, dibutoxybromoborane, boron trifluoride, boron tribromide, boron triiodide, phenyldibromoborane, p-phenyloxyphenyldibromoborane, n-butyldichloroborane, α-naphthyldichloroborane, phenylbutoxybromoborane, bis(2 - chlorovinyl)chloroborane, dibutylchloroborane, dibutylbromoborane, dimethylbromoborane, diphenylchloroborane, diphenylbromoborane, ethylborane, methylborane, diethylborane, dimethylborane, butylborane, phenylborane, dimethoxyborane.

Preferred boranes are those wherein X, Y and Z are alkyl of 1 through 8 carbon atoms, or $BH_3 \cdot Q$ wherein Q is triloweralkylamine.

The polymers of this invention increase the viscosity of organic hydrocarbons and are useful as viscosity-increasing oil additives for internal combustion engines. Some of the polymers can be pressed into transparent films having adhesive properties and are useful as com- The embodiments of the invention in which an exclusive property or privilege is claimed are defined as follows:

1. An imidazole-borane polymer having the recurring structural formula

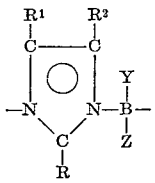

wherein Y and Z are selected from the group consisting of hydrogen, halogen, hydrocarbyl of up to 12 carbon atoms, O-hydrocarbyl of up to 12 carbon atoms, substituted hydrocarbyl and O-hydrocarbyl groups in which the substituents can be halogen, oxyalkyl, or oxyaryl of up to 6 carbon atoms and wherein Y and Z can be combined to form the divalent groups -O-alkyl-O- and -O-aryl-O- of up to 6 carbon atoms; and wherein R, R¹ and R² are selected from the group consisting of hydrogen, halogen of atomic number 17–53, alkyl of up to 15 carbon atoms, aryl of 6 through 10 carbon atoms, aralkyl of 7 through 12 carbon atoms, alkoxy-carbonyl of up to 8 carbon atoms, alkoxyalkyl of up to 8 carbon atoms, alkoxy of up to 8 carbon atoms, alkyl-carbonyl of up to 8 carbon atoms, arylcarbonyl of up to 12 carbon atoms, alkylthio of up to 8 carbon atoms, aralkyl-thio of up to 12 carbon atoms, cyano, nitro, formyl, or dialkylcarbamido of up to 12 carbon atoms, and wherein R¹ and R² can be joined together to form the group

2. Polymers of claim 1 wherein Y and Z are hydrogen or alkyl of 1 through 8 carbon atoms and R, R¹ and R² are hydrogen, alkyl of 1 through 6 carbon atoms, aryl of 6 through 10 carbon atoms, or halogen.

3. The polymer of claim 1 wherein Y and Z are each ethyl and R, R¹ and R² are each hydrogen.

4. The polymer of claim 1 wherein Y and Z are each ethyl, R is methyl, and R¹ and R² are each hydrogen.

5. The polymer of claim 1 wherein Y and Z are each ethyl, R is hydrogen, and R¹ and R² are joined together to form the group

6. The polymer of claim 1 wherein Y, Z, R, R¹ and R² are each hydrogen.

7. The polymer of claim 1 wherein Y and Z are each ethyl and R, R¹ and R² are each bromine.

8. Process for preparing polymers of the recurring structure unit

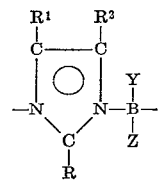

wherein Y and Z are selected from the group consisting of hydrogen, halogen, hydrocarbyl of up to 12 carbon atoms, O-hydrocarbyl of up to 12 carbon atoms, substituted hydrocarbyl and O-hydrocarbyl groups in which the substituents can be halogen, oxyalkyl, or oxyaryl of up to 6 carbon atoms and wherein Y and Z can be combined to form the divalent groups -O-alkyl-O- and -O-aryl-O- of up to 6 carbon atoms; and wherein R, R¹ and R² are selected from the group consisting of hydrogen, halogen of atomic number 17–53, alkyl of up to 15 carbon atoms, aryl of 6 through 10 carbon atoms, aralkyl of 7 through 12 carbon atoms, alkoxycarbonyl of up to 8 carbon atoms, alkoxyalkyl of up to 8 carbon atoms, alkoxy of up to 8 carbon atoms, alkylcarbonyl of up to 8 carbon atoms, arylcarbonyl of up to 12 carbon atoms, alkylthio of up to 8 carbon atoms, aralkylthio of up to 12 carbon atoms, cyano, nitro, formyl, or dialkylcarbamido of up to 12 carbon atoms, and wherein R¹ and R² can be joined together to form the group

which comprises reacting a compound of the formula

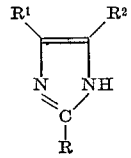

wherein R, R¹ and R² are defined as above with a reactant of the formula (1) BXYZ wherein Y and Z are defined as above and X is selected from the group consisting of hydrogen, halogen or alkyl up through 8 carbon atoms, with the proviso that when Y is hydrogen only one of X and Z can be hydrogen or (2) the compound BXYZ·Q wherein Y and Z are defined as above, X is selected from the group consisting of hydrogen, halogen or alkyl up through 8 carbon atoms, and Q is defined as an electron donor.

9. The process of claim 8 carried out in the presence of an inert solvent.

No references cited.

SAMUEL H. BLECH, *Primary Examiner.*

U.S. Cl. X.R.

260—309, 309.2, 47, 33.6, 33.8, 79; 161—192; 252—49.6